June 30, 1959  C. C. STUART  2,892,656
TRAILER FOR TRANSPORTING VEHICLES
Filed May 10, 1957  2 Sheets-Sheet 1

INVENTOR.
CLARENCE C. STUART
BY
*Barnes, Kisselle, Laughlin & Raisch*
ATTORNEYS.

June 30, 1959

C. C. STUART 2,892,656

TRAILER FOR TRANSPORTING VEHICLES

Filed May 10, 1957

INVENTOR.
CLARENCE C. STUART
BY
Barnes, Kisselle, Laughlin & Raisch
ATTORNEYS

# United States Patent Office 2,892,656
Patented June 30, 1959

2,892,656

TRAILER FOR TRANSPORTING VEHICLES

Clarence C. Stuart, Dearborn, Mich., assignor to Traffic Transport Engineering, Inc., Dearborn, Mich., a corporation of Michigan Application May 10, 1957, Serial No. 658,369

5 Claims. (Cl. 296—1)

This invention relates to a trailer for transporting automotive vehicles and particularly for transporting vehicles having a tiltable driver's cab.

The various States of the Union have differing requirements and regulations as to the maximum overall height, width and length of trailers utilized on their highways. When trailers are used to transport automotive vehicles such requirements and regulations must, of course, be complied with. A particular problem exists when the width of the vehicle to be transported is relatively great. For example, in one type of truck, a driver's cab is provided at the front end which is tiltable to provide access to the engine. Such a tiltable cab truck is relatively wide, the width of the cab being usually greater than the width or span between the front wheels. If the trailer utilized to transport one make of such tiltable cab truck now being manufactured is made wide enough so that the frame or superstructure surrounds the cab, the overall trailer width requirements of some states are exceeded.

It is therefore an object of this invention to provide a trailer for transporting vehicles having excessively wide cabs, which trailer has a minimum overall width and a minimum overall height and a length which is less than the combined lengths of the vehicles loaded thereon.

It is a further object of this invention to provide such a trailer wherein no part of the cab of the vehicle is required to pass between the sides of the trailer superstructure either during loading or after the trailer is loaded.

It is a further object of this invention to provide such a trailer which is easily loaded.

Figure 1:
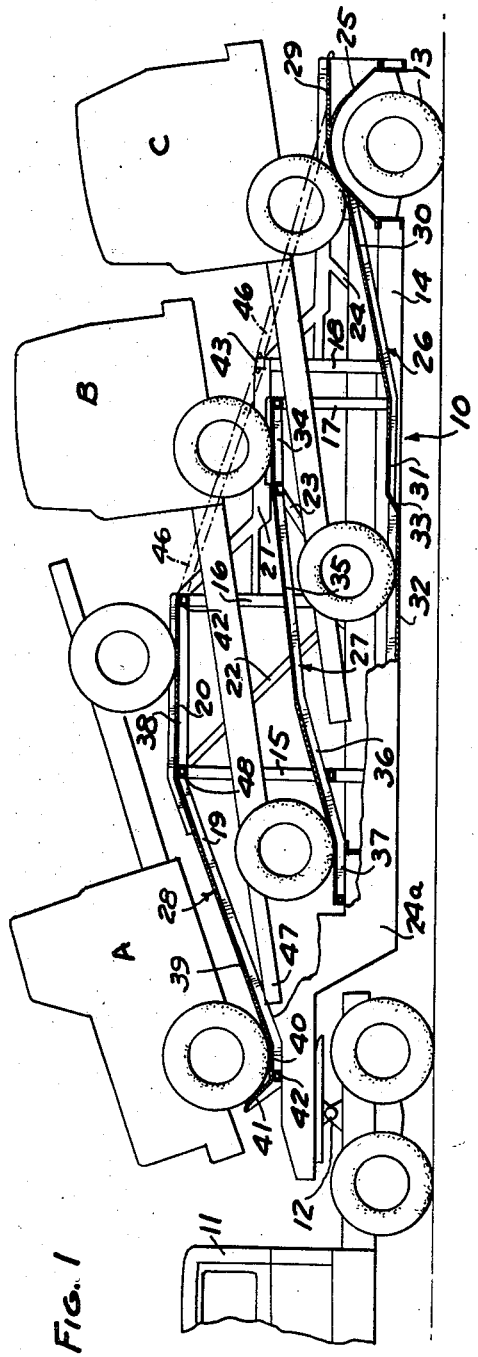
Fig. 1 is a fragmentary side elevational view of a tractor and trailer embodying the invention and loaded with three vehicles, parts being shown in section.

Referring to Fig. 1, trailer 10 is pivoted to a tractor 11 by means of a fifth wheel 12 at the forward end of the trailer. Wheels 13 are provided at the rear end of the trailer. Trailer 10 includes a frame of structural steel comprising a pair of longitudinally extending members 14, and at each side of the trailer longitudinally spaced vertical posts 15, 16, 17 and 18, struts 19, 20 and 21, and braces 22, 23 and 24. Additional structural members are provided to give the frame sufficient rigidity for supporting the tracks and the vehicles loaded on the tracks as presently described. In addition, portions of the sides of the trailer are enclosed by sheet metal panels 24a as required to protect the sides of the trailer.

As shown in Fig. 1, a deck 25 overlies each rear wheel 13. The frame of the trailer supports a pair of horizontally spaced lower tracks 26, intermediate tracks 27 and upper tracks 28. Lower tracks 26 are generally concave upwardly and extend forwardly from the rear end of the frame of the trailer. Intermediate tracks 27 are generally convex upwardly, overlie a portion of the lower tracks 26 and extend forwardly of the trailer. Upper tracks 28 are generally convex upwardly, overlie a portion of the intermediate tracks and extend forwardly into overlying relationship with the fifth wheel 12.

Each lower track 26 comprises a first section 29 extending generally rearwardly from deck 25. Each lower track 26 also includes a second section 30 extending from deck 25 forwardly and downwardly, a third section 31 which is generally horizontal and extends forwardly from the forward end of second section 30, and a fourth section 32 which is generally horizontal and at a lower vertical level than section 31. Section 32 extends forwardly from the forward end of section 31 and is connected thereto by a short abruptly inclined portion 33.

Each intermediate track 27 includes a first generally horizontal section 34 which is vertically spaced from and generally overlies third section 31 of lower track 26. Each intermediate track 27 also includes a second section 35 extending forwardly from the forward end of section 34 and inclined downwardly therefrom, a third section 36 extending forwardly from the front end of section 35 and inclined downwardly at a greater angle than section 35, and a fourth section 37 extending generally horizontally and forwardly from the front end of third section 36.

Each upper track 28 includes a generally horizontal first section 38 overlying the forward portion of section 35 and the rear portion of section 36 of the intermediate track. Each upper track 28 also includes a second section 39 inclined downwardly and forwardly from the front end of first section 38, a short section 40 extending generally horizontally and forwardly from the forward end of second section 39 and a fourth section 41 inclined upwardly from the forward end of section 40 to serve as a stop for the front wheels of the vehicle mounted on the upper track. As shown in Fig. 1, the frame may include fixed cross bars 42 extending beneath the tracks to strengthen the frame. As shown in Fig. 1, the inclination of second section 30 of lower track 26 is greater than the inclination of second section 35 of intermediate track 27 and less than the inclination of second section 39 of upper track 28.

Figure 3:
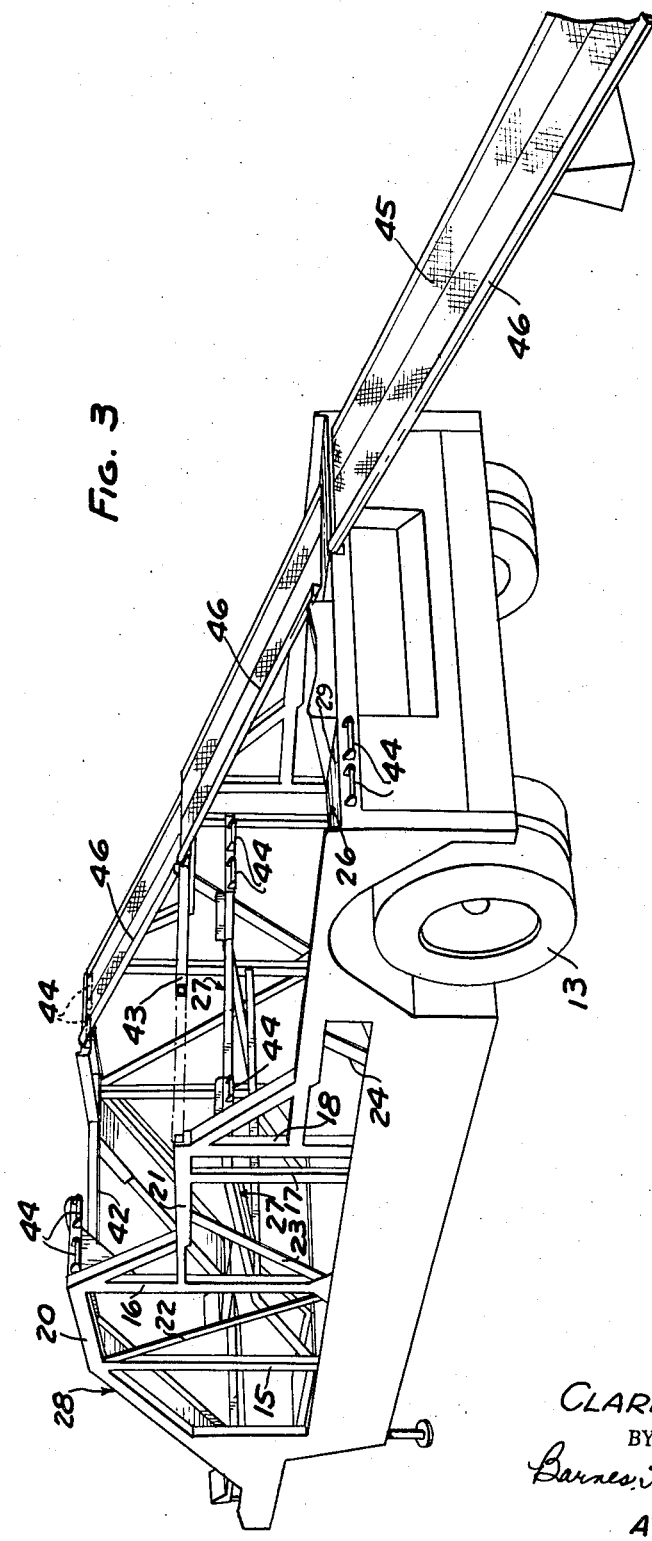
Fig. 3 is a perspective view of the trailer embodying the invention, on an enlarged scale, during another step in loading vehicles on the trailer, parts being shown in section and parts being broken away.

Referring to Figs. 1 and 3, vertical posts 18 include means for supporting a swinging cross bar 43 which is pivoted to the upper end of the post 18 at one side of the trailer. Hangers 44 (Fig. 3) are provided at the rear ends of each of the tracks for engagement with skids or removable tracks. As shown in Fig. 3, when the trailer is loaded, skids 45 are engaged with the rear end of the trailer in alignment with lower tracks 26. Removable skids 46 are provided between cross bar 43 and the end of the lower track 26. Removable skids 46 are provided between cross bar 43 and the rear end of upper tracks 28.

Figure 2:
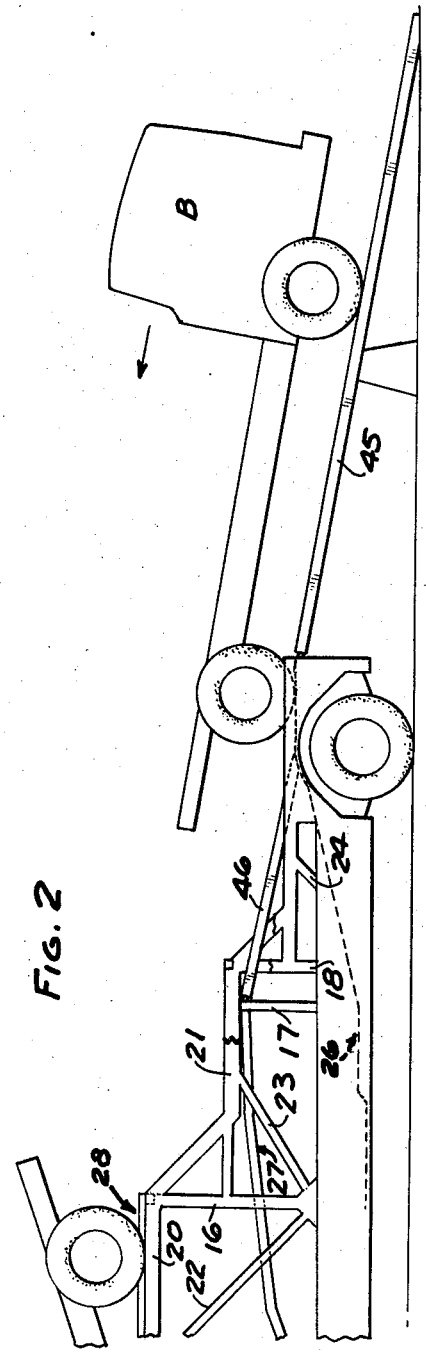
Fig. 2 is a fragmentary elevational view of the trailer embodying the invention during a step in loading vehicles on the trailer.

In order to load the trailer skids 45 are connected to the end of the trailer and two pairs of removable skids 46 are supported as shown in Fig. 3. A vehicle A is then driven over the skids 45 and the removable skids 46 onto the upper tracks 28 and is positioned on the upper tracks 28 with the cab of the vehicle A adjacent the forward end of the trailer. Skids 46 are then removed and cross bar 43 is swung to an out-of-the-way position against one side of the trailer. Then one set of the skids 46 is extended between the rear end portion of track 26 and the rear end of intermediate track 27. As shown in Fig. 2, a vehicle B is then backed over skids 45 and skids 46 onto intermediate tracks 27 and positioned on intermediate tracks 27 with the cab of the vehicle B facing rearwardly. Thereafter vehicle C is backed onto the skids 45 and the lower tracks 26 and positioned on the lower tracks 26 with the cab adjacent the rear facing rearwardly and disposed approximately over the wheels 13 of the trailer.

The inclination and length of the various sections of tracks 26, 27 and 28 are related as shown in the drawings so that the most compact arrangement of vehicles A, B and C can be obtained without interference between the vehicles and the trailer when loading. For example, the inclination of the rear portion of tracks 27 is determined so that when loading vehicle B the rear end 47 of its frame just clears the cross bar 42 at the rear ends of tracks 28. At no time during the loading or positioning is any portion of the cab of the vehicle driven between the sides of the frame of the trailer. The overall width of the trailer can thus be maintained, even though the width of the cabs is substantial. As shown in the drawings, vehicle A has a standard driver's cab and vehicles B and C have tiltable cabs.

I claim:

1. In a trailer for transporting vehicles having a cab at one end thereof, the combination comprising a frame having a fifth wheel adjacent the forward end thereof for attachment to a tractor and wheels adjacent the rear end thereof, superstructure extending longitudinally along opposite sides of said frame for supporting tracks, said superstructure including generally horizontal lower members having their rear ends terminating at the rear end of said trailer, generally horizontal intermediate members spaced vertically from said lower members, and generally horizontal upper members having their rear ends terminating at approximately the center of said trailer, the rear ends of said intermediate members terminating at a point spaced longitudinally between the rear ends of said upper and lower members, said superstructure including generally upright members extending from the frame of said trailer to said horizontal members, a pair of upper tracks extending from the rear of said upper members downwardly and forwardly into overlying relationship with the fifth wheel, a pair of intermediate tracks extending from the rear of said intermediate members downwardly and forwardly and having their forward ends terminating at a point spaced rearwardly from the fifth wheel and vertically below the forward ends of said upper tracks, and a pair of lower tracks extending from the rear of said lower members downwardly and forwardly below said upper and intermediate tracks, the maximum height of said trailer being defined by the rear portions of said upper members, the portions of the superstructure between the rear portions of said upper members and the rear portions of said intermediate members being below a flat plane connecting the rear ends of said upper and intermediate members, the portions of said superstructure between the rear portions of said intermediate members and the rear portions of said lower members being below a plane connecting the rear ends of said intermediate members and the rear ends of said lower members.

2. The combination set forth in claim 1 wherein said lower tracks are generally concave downwardly and said upper and intermediate tracks are generally convex upwardly.

3. The combination set forth in claim 1 wherein each of said lower tracks comprises a first generally horizontal section, a second section inclined downwardly and forwardly from the forward end of said first section and a third section extending substantially horizontally and forwardly from the forward end of said second section, each of said intermediate tracks comprises a generally horizontally extending first section overlying and vertically spaced from the rear portion of the third section of the lower track, a second track section extending from the forward end of said first track section and inclined downwardly, a third track section extending forwardly from the forward end of said second track section and inclined downwardly at a greater angle than said second track section, and a fourth track section extending forwardly and horizontally from the forward end of said third track section, and each of said upper tracks comprises a first generally horizontal section extending forwardly from and overlying a portion of the second section of the intermediate track, a second section extending forwardly from the forward end of said first section and inclined downwardly toward the front of the frame, and a third section extending forwardly and generally horizontally from the forward end of the second section.

4. The combination set forth in claim 3 wherein the inclination of the second section of each lower track is greater than the inclination of the second section of each intermediate track and less than the inclination of the second section of each upper track, the first section of each intermediate track lying in substantially the same horizontal plane as the third section of each upper track, the first section of each lower track lying in substantially the same horizontal plane as the fourth section of each intermediate track.

5. The combination set forth in claim 1 including a transversely extending cross bar movably mounted on the rear ends of said intermediate superstructure members, said cross bar being adapted to support removable track sections for loading a vehicle on the upper tracks and being movable out of position to permit loading of the intermediate tracks.

References Cited in the file of this patent

UNITED STATES PATENTS

| 2,452,270 | Stuart | Oct. 26, 1948 |
| 2,598,113 | Dawson | May 27, 1952 |
| 2,730,400 | Francis | Jan. 10, 1956 |